(12) United States Patent
Jeong et al.

(10) Patent No.: US 8,849,119 B2
(45) Date of Patent: Sep. 30, 2014

(54) WAVELENGTH-SHIFTED BIDIRECTIONAL WAVELENGTH DIVISION MULTIPLEXING OPTICAL NETWORK

(71) Applicant: Electronics and Telecommunications Research Institute, Daejeon (KR)

(72) Inventors: Jong Sool Jeong, Daejeon (KR); Hyun Soo Kim, Daejeon (KR); Mi-Ran Park, Daejeon (KR); Byunseok Choi, Daejeon (KR); O-Kyun Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 95 days.

(21) Appl. No.: 13/674,262

(22) Filed: Nov. 12, 2012

(65) Prior Publication Data
US 2013/0209105 A1 Aug. 15, 2013

(30) Foreign Application Priority Data

Feb. 9, 2012 (KR) .................. 10-2012-0013396
Jul. 30, 2012 (KR) .................. 10-2012-0082985

(51) Int. Cl.
*H04J 14/02* (2006.01)
(52) U.S. Cl.
CPC ......... *H04J 14/0282* (2013.01); *H04J 14/0265* (2013.01); *H04J 14/0246* (2013.01); *H04J 14/025* (2013.01)
USPC .................. 398/72; 398/67; 398/79; 398/135

(58) Field of Classification Search
CPC . H04J 14/0246; H04J 14/025; H04J 14/0265; H04J 14/0282
See application file for complete search history.

(56) References Cited

U.S. PATENT DOCUMENTS

| 7,596,317 B2 * | 9/2009 | Lee et al. ......................... 398/67 |
| 7,738,167 B2 | 6/2010 | Kim et al. |
| 2005/0025486 A1 * | 2/2005 | Zhong et al. .................... 398/79 |

(Continued)

FOREIGN PATENT DOCUMENTS

| JP | 2002-135212 A | 5/2002 |
| KR | 10-2007-0013539 A | 1/2007 |

OTHER PUBLICATIONS

Wooram Lee et al., "Bidirectional WDM-PON Based on Gain-Saturated Reflective Semiconductor Optical Amplifiers", IEEE Photonics Technology Letters, Nov. 2005, pp. 2460-2462, vol. 17, No. 11.

(Continued)

*Primary Examiner* — David Payne
*Assistant Examiner* — Omar S Ismail
(74) *Attorney, Agent, or Firm* — Rabin & Berdo, P.C.

(57) ABSTRACT

Disclosed is a wavelength-shifted bidirectional WDM optical network including: an optical line terminal including an optical line terminal (OLT) including a first optical transmitter transmitting a downstream WDM optical signal, a first high-density wavelength multiplexer/demultiplexer wavelength-multiplexing the downstream WDM optical signal or wavelength-demultiplexing a wavelength-multiplexed upstream WDM optical signal, and a first optical receiver receiving the wavelength-demultiplexed upstream WDM optical signal; a remote node (RN) including a second high-density wavelength multiplexer/demultiplexer shifting a center wavelength of the upstream WDM optical signal and wavelength-multiplexing the upstream WDM optical signal with the shifted center wavelength or wavelength-demultiplexing the wavelength-multiplexed downstream WDM optical signal; and multiple optical network units (ONUs) each including a second optical transmitter transmitting the upstream WDM optical signal and second optical receiver receiving the wavelength-demultiplexed downstream WDM optical signal.

15 Claims, 7 Drawing Sheets

(56) References Cited

U.S. PATENT DOCUMENTS

| | | | |
|---|---|---|---|
| 2005/0074240 A1* | 4/2005 | Jung et al. | 398/72 |
| 2006/0222364 A1* | 10/2006 | Chung et al. | 398/72 |
| 2007/0280695 A1* | 12/2007 | Li et al. | 398/135 |
| 2008/0131125 A1* | 6/2008 | Byoung Whi et al. | 398/72 |
| 2010/0158512 A1* | 6/2010 | Chang et al. | 398/7 |
| 2010/0278535 A1* | 11/2010 | Kim | 398/72 |

OTHER PUBLICATIONS

Soo-Jin Park et al., "Fiber-to-the-Home Services Based on Wavelength-Division-Multiplexing Passive Optical Network", Journal of Lightwave Technology, Nov. 2004, pp. 2582-2591, vol. 22, No. 11.

* cited by examiner

WAVELENGTH-SHIFTED BIDIRECTIONAL WAVELENGTH DIVISION MULTIPLEXING OPTICAL NETWORK

CROSS-REFERENCE TO RELATED APPLICATIONS

This application is based on and claims priority from Korean Patent Application Nos. 10-2012-0013396, filed on Feb. 9, 2012, and 10-2012-0082985, filed on Jul. 30, 2012, with the Korean Intellectual Property Office, the disclosure of which is incorporated herein in its entirety by reference.

TECHNICAL FIELD

The present disclosure relates to an optical network, and more particularly, to a wavelength-shifted bidirectional wavelength division multiplexing optical network.

BACKGROUND

The wavelength division multiplexing (WDM) scheme is a scheme for transmitting multiple optical signals with different wavelengths through one optical fiber. A WDM optical network using the WDM scheme includes a central office (CO), optical network units (ONUs), and an optical distribution network for connecting the CO and the ONUs. Among various optical distribution networks, the most economic structure is a star configuration in which a remote node (RN) including an optical multiplexer/demultiplexer is disposed in an area adjacent to ONUs, a CO is connected to the RN by a single optical fiber, and then the RN is connected to the ONUs by optical fibers.

Now the most well-known WDM optical network has a configuration in which a wavelength band used for upstream WDM optical signals is separated and different from a wavelength band used for downstream WDM optical signals. In the most typical configuration of such a wavelength band-separated WDM optical network, one cyclic wavelength multiplexer/demultiplexer is disposed in a CO and an RN respectively, the CO-wavelength multiplexer/demultiplexer is connected to the RN-wavelength multiplexer/demultiplexer by a single optical fiber, and then each port of the wavelength multiplexer/demultiplexer is connected to an ONU. Here, an optical transceiver includes an optical filter for wavelength band separation, an optical transmitter, and an optical receiver.

However, the narrower a wavelength guard band, the more difficult it is to technically implement an optical filter for wavelength band separation. Also, since the wavelength band-separated WDM optical network requires a wavelength guard band, it has a disadvantage in that the wavelength band of upstream WDM optical signals and the wavelength band of downstream WDM optical signals are limited. Further, since the wavelength band-separated WDM optical network uses different wavelength bands for upstream/downstream WDM optical signals, it is complex in that upstream/downstream semiconductor light sources have different semiconductor medium compositions.

In order to remedy these shortcomings, a wavelength-reuse WDM optical network has been proposed. Although the wavelength-reuse WDM optical network is advantageous in that it uses the same semiconductor light source because the same wavelength is used for upstream/downstream WDM optical signals, it has a fundamental problem in that a WDM optical signal has a small extinction ratio and deterioration in the quality of a WDM optical signal is caused by Rayleigh backscattering and the like.

SUMMARY

The present disclosure has been made in an effort to provide a wavelength-shifted bidirectional wavelength division multiplexing optical network that can essentially block signal distortion due to Rayleigh backscattering, reflected light from optical components, and the like, which may occur between an upstream WDM optical signal and a downstream WDM optical signal when one optical fiber is used.

Further, the present disclosure has been made in an effort to provide a wavelength-shifted bidirectional wavelength division multiplexing optical network that allows the central wavelength of an upstream WDM optical signal to be between the center wavelengths of adjacent downstream WDM optical signals.

First and second exemplary embodiments of the present disclosure provide a wavelength-shifted bidirectional wavelength division multiplexing (WDM) optical network including: an optical line terminal (OLT) including a first optical transmitter transmitting a downstream WDM optical signal, a first standard wavelength multiplexer/demultiplexer wavelength-multiplexing the downstream WDM optical signal, a first optical circulator transferring the wavelength-multiplexed downstream WDM optical signal through an optical fiber line or transferring a wavelength-multiplexed upstream WDM optical signal transferred through the optical fiber line, a first wavelength-shifted wavelength multiplexer/demultiplexer wavelength-demultiplexing the wavelength-multiplexed upstream WDM optical signal transferred through the first circulator, and a first optical receiver receiving the wavelength-demultiplexed upstream WDM optical signal; a remote node (RN) including a second wavelength-shifted wavelength multiplexer/demultiplexer shifting a center wavelength of the upstream WDM optical signal and wavelength-multiplexing the upstream WDM optical signal with the shifted center wavelength, a second circulator transferring the wavelength-multiplexed upstream WDM optical signal through the optical fiber line or transferring the wavelength-multiplexed downstream WDM optical signal transferred through the optical fiber line, and a second standard wavelength multiplexer/demultiplexer wavelength-demultiplexing the wavelength-multiplexed downstream WDM optical signal transferred through the second circulator; and multiple optical network units (ONUs) each including a second optical transmitter transmitting the upstream WDM optical signal and second optical receiver receiving the wavelength-demultiplexed downstream WDM optical signal.

Third to fifth exemplary embodiments of the present disclosure provide a wavelength-shifted bidirectional wavelength division multiplexing (WDM) optical network including: an optical line terminal (OLT) including a first optical transmitter transmitting a downstream WDM optical signal, a first high-density wavelength multiplexer/demultiplexer wavelength-multiplexing the downstream WDM optical signal or wavelength-demultiplexing a wavelength-multiplexed upstream WDM optical signal, and a first optical receiver receiving the wavelength-demultiplexed upstream WDM optical signal; a remote node (RN) including a second high-density wavelength multiplexer/demultiplexer shifting a center wavelength of the upstream WDM optical signal and wavelength-multiplexing the upstream WDM optical signal with the shifted center wavelength or wavelength-demultiplexing the wavelength-multiplexed downstream WDM optical signal; and multiple optical network units (ONUs) each including a second optical transmitter transmitting the upstream WDM optical signal and second optical receiver receiving the wavelength-demultiplexed downstream WDM optical signal.

According to the exemplary embodiments of the present disclosure, since a wavelength-shifted bidirectional wavelength division multiplexing optical network is provided which allows a difference to be made between the wavelength of an upstream WDM optical signal and the wavelength of a downstream WDM optical signal by applying a standard wavelength system to the downstream WDM optical signal and applying a shifted wavelength system to the upstream WDM optical system, it is possible to essentially block signal distortion due to Rayleigh backscattering, reflected light from optical components, and the like, which may occur when one optical fiber is used, and thus provide a high-quality optical network.

Further, since a wavelength-shifted bidirectional wavelength division multiplexing optical network is provided which allows the center wavelength of an upstream WDM optical signal to be between the center wavelengths of adjacent downstream WDM optical signals, it is possible to use the same wavelength band for upstream and downstream WDM optical signals without wavelength band extension and thereby generate upstream and downstream WDM optical signals by using a semiconductor light source of the same wavelength band, which simplifies the configuration of an optical network and significantly reduces the network implementation cost.

Further, since a wavelength-shifted bidirectional wavelength division multiplexing optical network is provided which does not allow a wavelength guard band to exist between the wavelength band of upstream WDM optical signals and the wavelength band of downstream WDM optical signals, it is possible to not only use an inexpensive optical line terminal, but also increase the number of acceptable subscribers in the optical system and ensure the channel extendibility of the optical network by simply increasing the number of channels of a wavelength multiplexer/demultiplexer.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. In a description of the present disclosure, a detailed description of related known configurations and functions will be omitted when it may make the essence of the present disclosure obscure.

Figure 1:
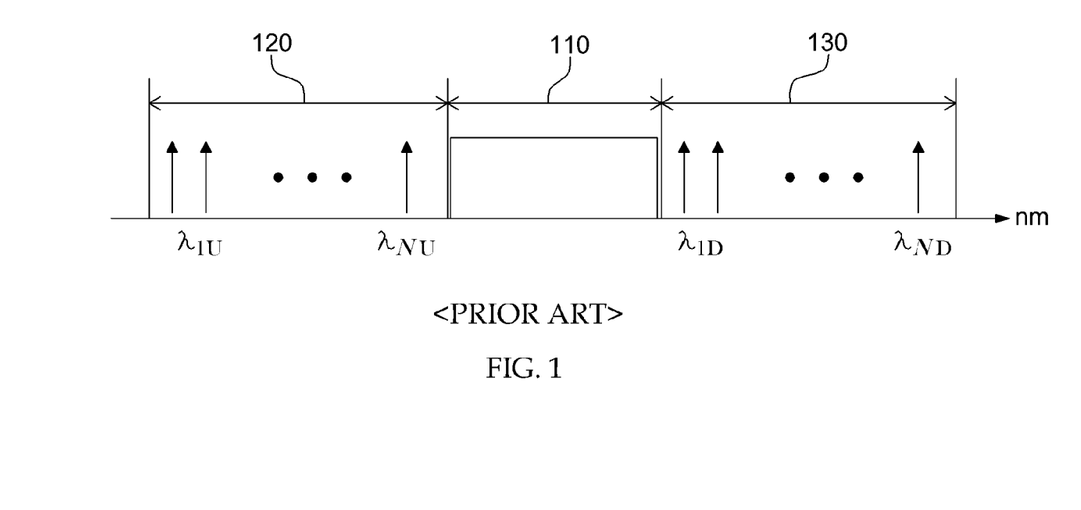
FIG. 1 is a view illustrating the wavelength bands of upstream and downstream WDM optical signals in a conventional wavelength band-separated WSM optical network.

FIG. 1 illustrates the wavelength bands of upstream and downstream WDM optical signals in a conventional wavelength band-separated WDM optical network.

As shown in FIG. 1, in the conventional wavelength band-separated WDM optical network, a wavelength guard band 110 exists, and thus it can be noted that the wavelength band 120 of upstream WDM optical signals and the wavelength band 130 of downstream WDM optical signals are limited.

Figure 2:
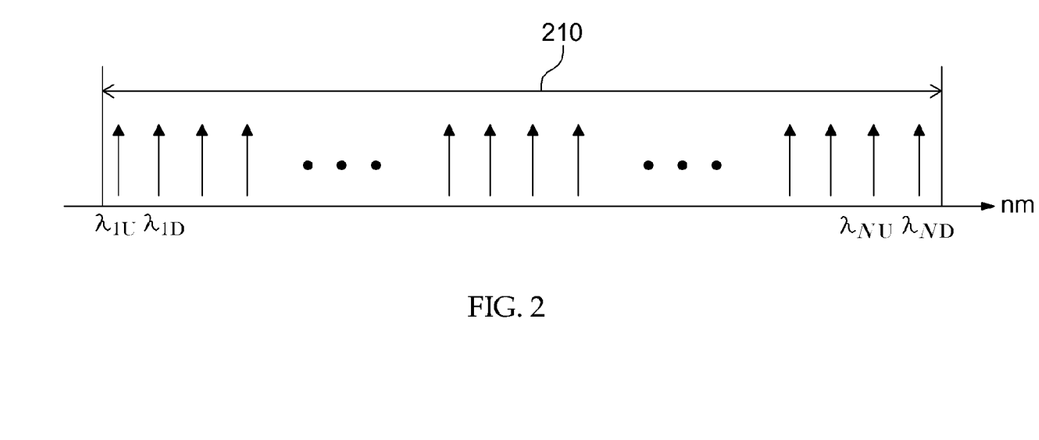
FIG. 2 is a view illustrating the wavelength bands of upstream and downstream WDM optical signals in a wavelength-shifted bidirectional WDM optical network according to the present disclosure.

FIG. 2 illustrates the wavelength bands of upstream and downstream WDM optical signals in a wavelength-shifted bidirectional WDM optical network according to the present disclosure.

As shown in FIG. 2, in the wavelength-shifted bidirectional WDM optical network according to the present disclosure, the wavelength band of upstream WDM optical signals is shifted such that the center wavelength of each upstream WDM optical signal is between the center wavelengths of adjacent downstream WDM optical signals. Accordingly, in the wavelength-shifted bidirectional WDM optical network according to the present disclosure, it is possible to use the same wavelength band for upstream and downstream WDM optical signals while maintaining channel spacing between each upstream WDM optical signal and each downstream WDM optical signal as in the conventional wavelength band-separated WDM optical network. Further, in the wavelength-shifted bidirectional WDM optical network according to the present disclosure, the wavelength band 210 of upstream/downstream WDM optical signals can be extended without limitation because a wavelength guard band does not exist.

Figure 3:
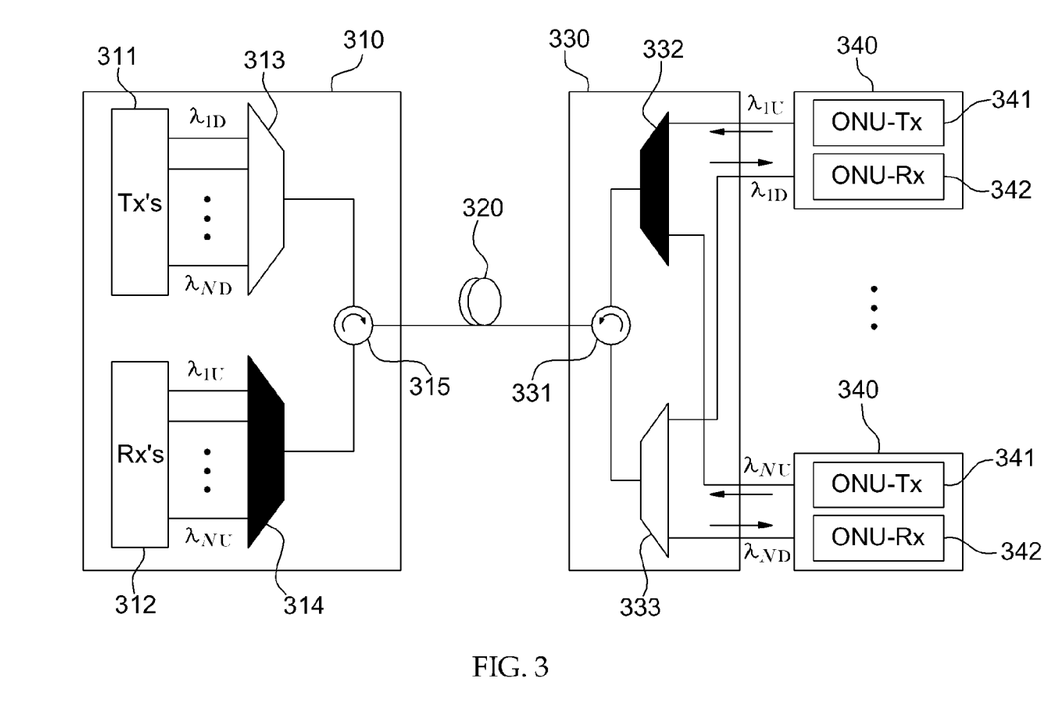
FIG. 3 is a block diagram illustrating a configuration of a wavelength-shifted bidirectional WDM optical network according to a first exemplary embodiment of the present disclosure.

FIG. 3 illustrates a configuration of a wavelength-shifted bidirectional WDM optical network according to a first exemplary embodiment of the present disclosure.

Referring to FIG. 3, the wavelength-shifted bidirectional WDM optical network according to the first exemplary embodiment of the present disclosure substantially includes an optical line terminal (OLT) 310, a remote node (RN) 330, and multiple optical network units (ONUs) 340.

The OLT 310 according to the present disclosure includes a first optical transmitter 311, a first optical receiver 312, a first standard wavelength multiplexer/demultiplexer 313, a first wavelength-shifted wavelength multiplexer/demultiplexer 314, and a first optical circulator 315. Here, each of the first standard wavelength multiplexer/demultiplexer 313 and the first wavelength-shifted wavelength multiplexer/demultiplexer 314 may be formed by an arrayed waveguide grating (AWG) and a thin-film filter.

The first optical transmitter 311 transmits a downstream WDM optical signal. Here, the first optical transmitter 311 is connected to each channel of the first standard wavelength multiplexer/demultiplexer 313. Also, the first optical transmitter may include any one of a wavelength-tunable laser light source, a wavelength-locked laser light source, a broadband incoherent light source, and a broadband external-injection wavelength-locked light source.

The first optical receiver receives an upstream WDM optical signal wavelength-demultiplexed by the first wavelength-shifted wavelength multiplexer/demultiplexer 314. Here, the first optical receiver 312 is connected to each channel of the first wavelength-shifted wavelength multiplexer/demultiplexer 314.

The first standard wavelength multiplexer/demultiplexer 313 wavelength-multiplexes a downstream WDM optical signal.

The first wavelength-shifted wavelength multiplexer/demultiplexer 314 wavelength-demultiplexes a wavelength-multiplexed upstream WDM optical signal transferred through the first optical circulator 315.

The first optical circulator 315 transfers a downstream WDM optical signal wavelength-multiplexed by the first standard wavelength multiplexer/demultiplexer 313 through an optical fiber line 320, or transfers a wavelength-multiplexed upstream WDM optical signal transferred through the optical fiber line 320 to the first wavelength-shifted wavelength multiplexer/demultiplexer 314.

The RN 330 according to the present disclosure includes a second optical circulator 331, a second wavelength-shifted wavelength multiplexer/demultiplexer 332, and a second standard wavelength multiplexer/demultiplexer 333. Here, each of the second wavelength-shifted wavelength multiplexer/demultiplexer 332 and the second standard wavelength multiplexer/demultiplexer 333 may be formed by an arrayed waveguide grating (AWG) and a thin-film filter.

The second optical circulator 331 transfers an upstream WDM optical signal wavelength-multiplexed by the second wavelength-shifted wavelength multiplexer/demultiplexer 332 through the optical fiber line 320, or transfers a wavelength-multiplexed downstream WDM optical signal transferred through the optical fiber line 320 to the second standard wavelength multiplexer/demultiplexer 333.

The second wavelength-shifted wavelength multiplexer/demultiplexer 332 shifts the center wavelength of an upstream WDM optical signal such that the center wavelength of the upstream WDM optical signal is between the center wavelengths of adjacent downstream WDM optical signals, and wavelength-multiplexes the upstream WDM optical signal with the shifted center wavelength.

Although the first exemplary embodiment of the present disclosure describes an example of shifting the center wavelength of an upstream WDM optical signal, the present disclosure is not limited thereto, and it is also possible to fix the center wavelength of an upstream WDM optical signal and shift the center wavelength of a downstream WDM optical signal. In this case, each of the first standard wavelength multiplexer/demultiplexer 313 and the second standard wavelength multiplexer/demultiplexer 333 may be replaced by a wavelength-shifted wavelength multiplexer and each of the second wavelength-shifted wavelength multiplexer/demultiplexer 332 and the first wavelength-shifted wavelength multiplexer/demultiplexer 314 may be replaced by a standard wavelength multiplexer/demultiplexer.

The second standard wavelength multiplexer/demultiplexer 333 wavelength-demultiplexes a wavelength-multiplexed downstream WDM optical signal transferred through the second optical circulator 331.

Here, each channel of the second wavelength-shifted wavelength multiplexer/demultiplexer 332 and each channel of the second standard wavelength multiplexer/demultiplexer 333 are connected in pairs to the multiple ONUs 340 on a channel-by-channel basis.

Each ONU 340 according to the present disclosure includes a second optical transmitter 341 and a second optical receiver 342.

The second optical transmitter 341 transmits an upstream WDM optical signal.

The second optical receiver 342 receives a downstream WDM optical signal wavelength-demultiplexed by the second standard wavelength multiplexer/demultiplexer 333.

As a result of this configuration, the optical fiber starting from the first standard wavelength multiplexer/demultiplexer 313 of the OLT 310 is connected to the second optical receiver 342 of the ONU 340, and the optical fiber starting from the first wavelength-shifted wavelength multiplexer/demultiplexer 314 of the OLT 310 is connected to the second transmitter 341 of the ONU 340.

Hereinafter, a procedure of transmitting upstream and downstream WDM optical signals in the wavelength-shifted bidirectional WDM optical network according to the first exemplary embodiment of the present disclosure will be described.

The first optical transmitter 311 of the OLT 310 transmits a downstream WDM optical signal, the first standard wavelength multiplexer/demultiplexer 313 wavelength-multiplexes the downstream WDM optical signal, and the first optical circulator 315 transfers the downstream WDM optical signal wavelength-multiplexed by the first standard wavelength multiplexer/demultiplexer 313 through the optical fiber line 320. Subsequently, the second optical circulator 331 of the RN 330 transfers the wavelength-multiplexed downstream WDM optical signal transferred through the optical fiber line 320 to the second standard wavelength multiplexer/demultiplexer 333, the second standard wavelength multiplexer/demultiplexer 333 wavelength-demultiplexes the wavelength-multiplexed downstream WDM optical signal transferred through the second optical circulator 331, and the second optical receiver 342 of the ONU 340 receives the downstream WDM optical signal wavelength-demultiplexed by the second standard wavelength multiplexer/demultiplexer 333.

In addition, the second optical transmitter 341 of the ONU 340 transmits an upstream WDM optical signal, the second wavelength-shifted wavelength multiplexer/demultiplexer 332 of the RN 330 shifts the center wavelength of the upstream WDM optical signal and wavelength-multiplexes the upstream WDM optical signal with the shifted center wavelength, and the second optical circulator 331 transfers the upstream WDM optical signal wavelength-multiplexed by the second wavelength-shifted wavelength multiplexer/demultiplexer 332 through the optical fiber line 320. Subsequently, the first optical circulator 315 of the OLT 310 transfers the upstream WDM optical signal transferred through the optical fiber line 320 to the first wavelength-shifted wavelength multiplexer/demultiplexer 314, the first wavelength-shifted wavelength multiplexer/demultiplexer 314 wavelength-demultiplexes the wavelength-multiplexed upstream WDM optical signal transferred through the first optical circulator 315, and the first optical receiver 312 receives the upstream WDM optical signal wavelength-demultiplexed by the first wavelength-shifted wavelength multiplexer/demultiplexer 314.

Therefore, in the wavelength-shifted bidirectional WDM optical network according to the present invention, the transmission mechanism of an upstream WDM optical signal is completely separated from that of a downstream WDM optical signal, and thus it is possible to essentially block deterioration in the quality of an optical signal due to backscattering induced in the optical fiber and reflected light occurring in the sections of optical components.

Figure 4:
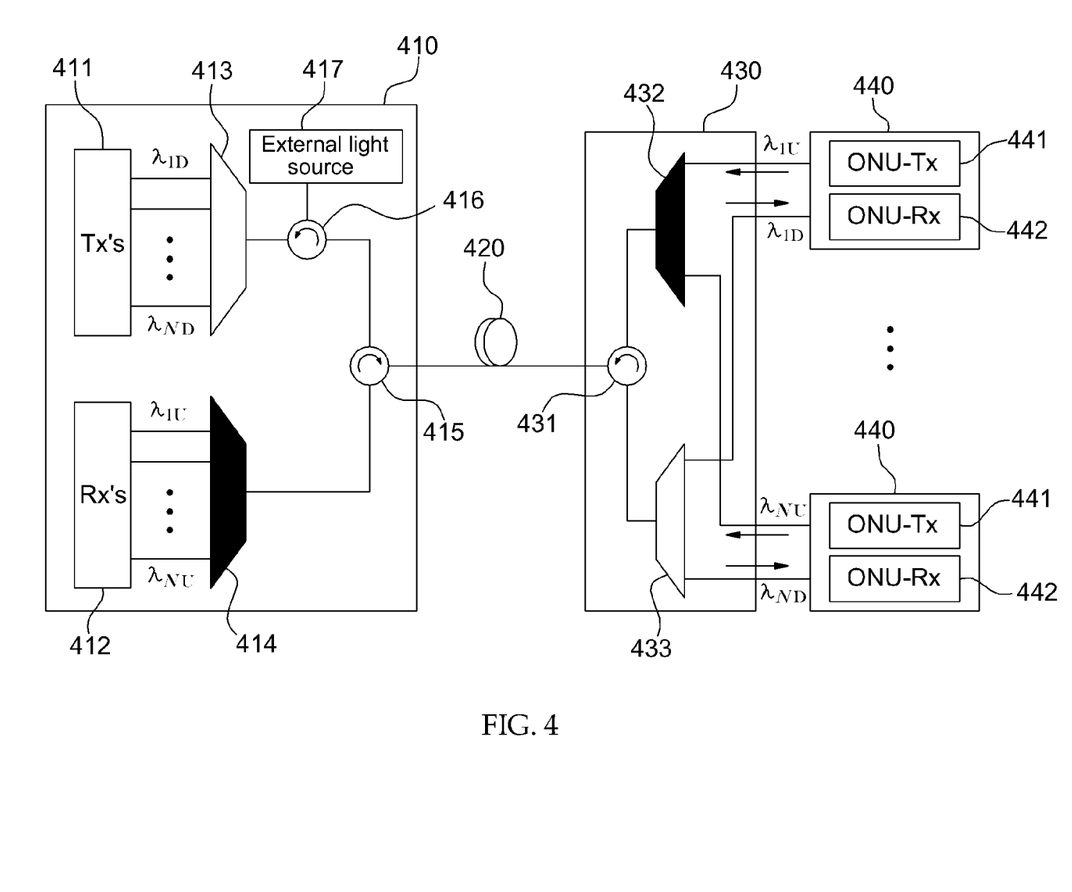
FIG. 4 is a block diagram illustrating a configuration of a wavelength-shifted bidirectional WDM optical network according to a second exemplary embodiment of the present disclosure.

FIG. 4 illustrates a configuration of a wavelength-shifted bidirectional WDM optical network according to a second exemplary embodiment of the present disclosure.

Referring to FIG. 4, the wavelength-shifted bidirectional WDM optical network according to the second exemplary embodiment of the present disclosure has similar constituent elements to those of the wavelength-shifted bidirectional WDM optical network of FIG. 3, but generates a downstream WDM optical signal by using an external light source 417. To this end, the wavelength-shifted bidirectional WDM optical network according to the second exemplary embodiment of the present disclosure further includes a third optical circulator 416 that is disposed between the first standard wavelength multiplexer/demultiplexer 413 and the first optical circulator 415, and the external light source 417.

A procedure of transmitting a downstream WDM optical signal in the OLT 410 of the wavelength-shifted bidirectional WDM optical network according to the second exemplary embodiment of the present disclosure is as follows:

The external light source 417 generates an optical signal, and the third optical circulator 416 transfers the optical signal generated in the external light source 417 to the first standard wavelength multiplexer/demultiplexer 413. The first standard wavelength multiplexer/demultiplexer 413 separates the optical signal according to wavelengths to inject the separated optical signal into the first optical transmitter 411. The first optical transmitter 411 amplifies and modulates the optical signal separated according to wavelengths to generate a downstream WDM optical signal, and transfers the generated downstream WDM optical signal to the first standard wavelength multiplexer/demultiplexer 413. The first standard wavelength multiplexer/demultiplexer 413 wavelength-multiplexes the downstream WDM optical signal, and transfers the wavelength-multiplexed downstream WDM optical signal through the optical fiber line 420 via the third optical circulator 416 and the first optical circulator 415.

Figure 5:
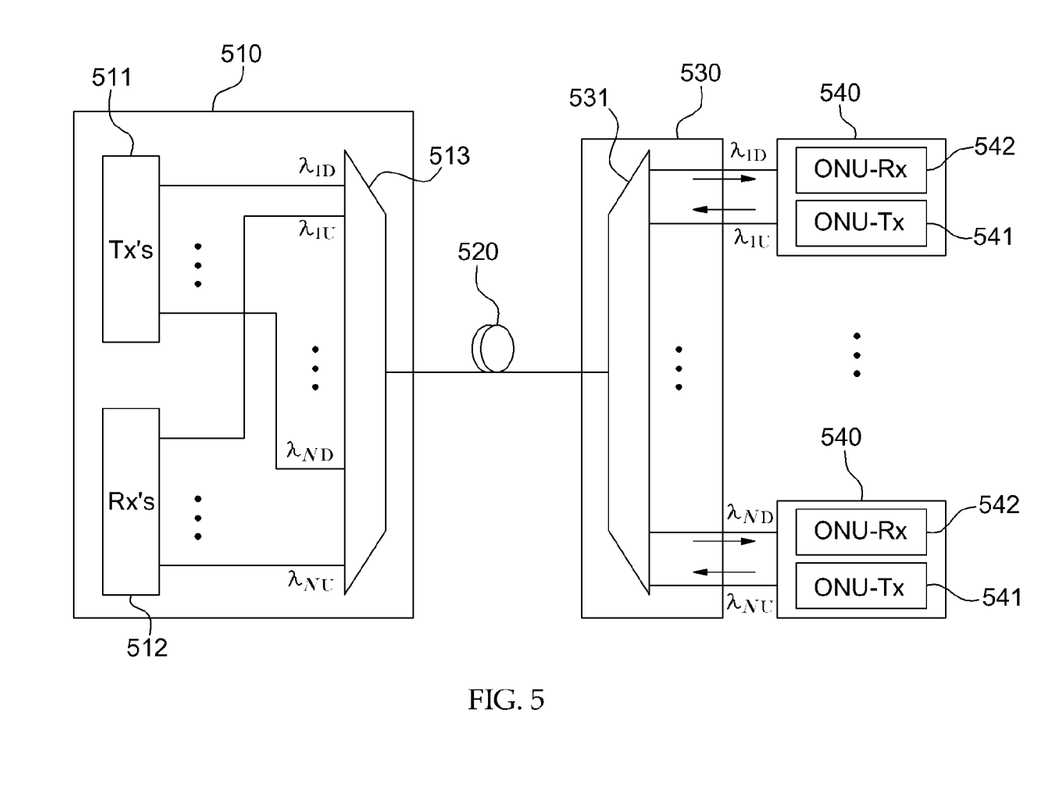
FIG. 5 is a block diagram illustrating a configuration of a wavelength-shifted bidirectional WDM optical network according to a third exemplary embodiment of the present disclosure.

FIG. 5 illustrates a configuration of a wavelength-shifted bidirectional WDM optical network according to a third exemplary embodiment of the present disclosure.

Referring to FIG. 5, in the wavelength-shifted bidirectional WDM optical network according to the third exemplary embodiment of the present disclosure, each of the OLT 510 and the RN 530 includes a high-density wavelength multiplexer/demultiplexer 513 or 531 instead of the standard wavelength multiplexer/demultiplexer and the wavelength-shifted wavelength multiplexer/demultiplexer. Accordingly, in the wavelength-shifted bidirectional WDM optical network according to the third exemplary embodiment of the present disclosure, the number of channels is doubled and channel spacing is halved as compared to the wavelength-shifted bidirectional WDM optical network of FIG. 3.

Further, in the OLT 510, odd-numbered channels of the first high-density wavelength multiplexer/demultiplexer 513 are connected to the first optical transmitter 511, and even-numbered channels of the first high-density wavelength multiplexer/demultiplexer 513 are connected to the first optical receiver 512.

Contrarily, in the RN 530, odd-numbered channels of the second high-density wavelength multiplexer/demultiplexer 531 are connected to the second optical receiver 542, and even-numbered channels of the second high-density wavelength multiplexer/demultiplexer 531 are connected to the second optical transmitter 541.

Accordingly, a downstream WDM optical signal is transmitted to the second optical receiver 542 of the ONU 540 over an odd-numbered channel, and an upstream WDM optical signal is transmitted to the first optical receiver 512 of the OLT 510 over an even-numbered channel.

However, the wavelength-shifted bidirectional WDM optical network of FIG. 5 may cause optical signal distortion due to inter-channel interference, which may occur in the high-density wavelength multiplexer/demultiplexer 513 or 531.

Figure 6:
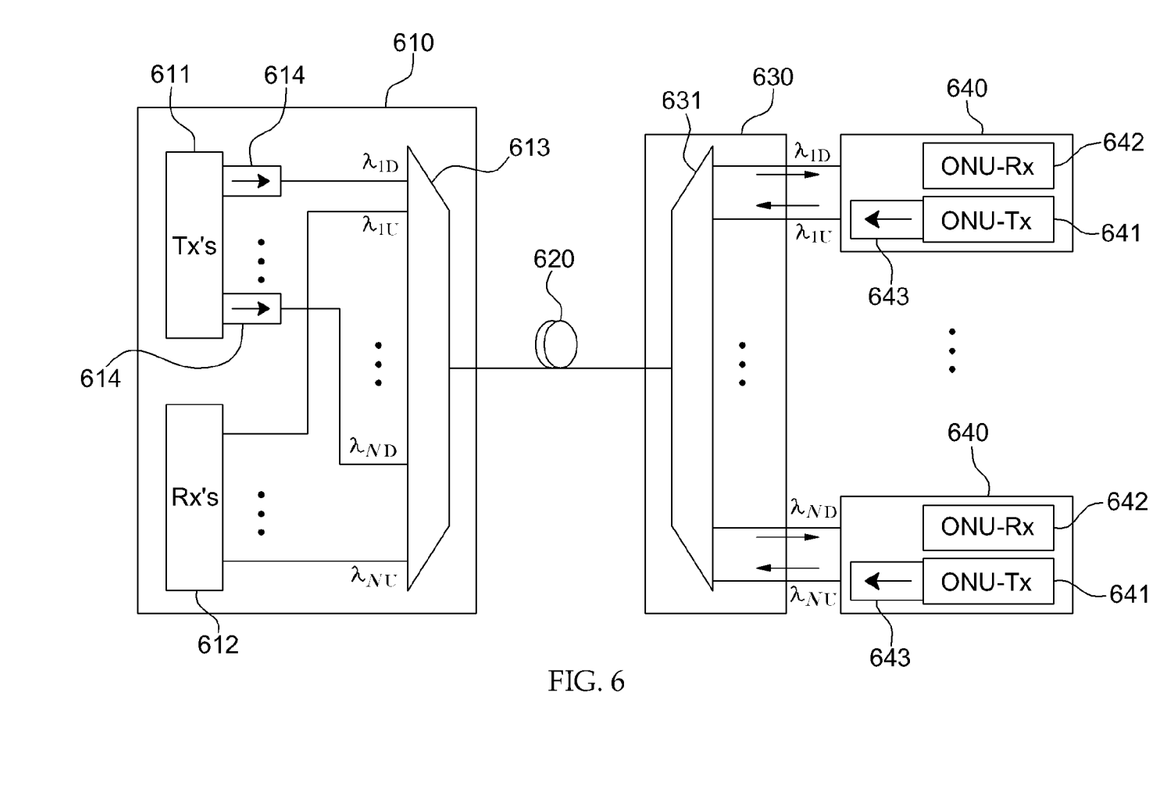
FIG. 6 is a block diagram illustrating a configuration of a wavelength-shifted bidirectional WDM optical network according to a fourth exemplary embodiment of the present disclosure.

Therefore, as shown in FIG. 6 illustrating a wavelength-shifted bidirectional WDM optical network according to a fourth exemplary embodiment of the present disclosure, an optical isolator 614 or 643 may be disposed at the front end of each of the first optical transmitter 611 of the OLT 610 and the second optical transmitter 643 of the ONU 640.

Accordingly, the wavelength-shifted bidirectional WDM optical network according to the fourth exemplary embodiment of the present disclosure can eradicate deterioration in the quality of an optical signal due to inter-channel interference.

Figure 7:
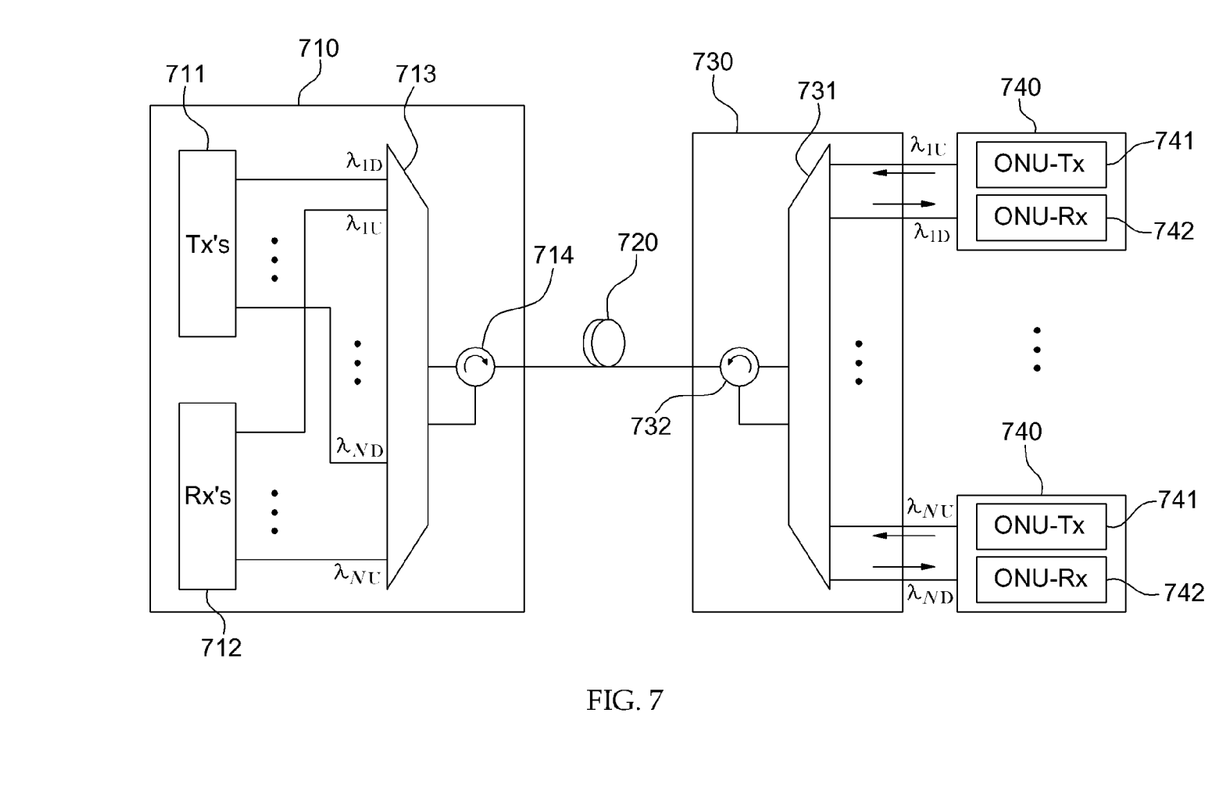
FIG. 7 is a block diagram illustrating a configuration of a wavelength-shifted bidirectional WDM optical network according to a fifth exemplary embodiment of the present disclosure.

FIG. 7 illustrates a configuration of a wavelength-shifted bidirectional WDM optical network according to a fifth exemplary embodiment of the present disclosure.

Referring to FIG. 7, in order to mitigate interference between upstream and downstream channels in the wavelength-shifted bidirectional WDM optical network according to the fifth exemplary embodiment of the present disclosure, each of the first high-density wavelength multiplexer/demultiplexer 713 and the second high-density wavelength multiplexer/demultiplexer 731 is a 2×2N high-density wavelength multiplexer/demultiplexer, and to this end an optical circulator 714 or 732 is disposed at the front end of each of the first high-density wavelength multiplexer/demultiplexer 713 and the second high-density wavelength multiplexer/demultiplexer 731.

Further, in the OLT 710, odd-numbered channels of the first high-density wavelength multiplexer/demultiplexer 713 are connected to the first optical transmitter 711, and even-numbered channels of the first high-density wavelength multiplexer/demultiplexer 713 are connected to the first optical receiver 712.

Similarly, in the RN 730, odd-numbered channels of the second high-density wavelength multiplexer/demultiplexer 731 are connected to the second optical transmitter 741, and even-numbered channels of the second high-density wavelength multiplexer/demultiplexer 731 are connected to the second optical receiver 741.

Hereinafter, a procedure of transmitting upstream and downstream WDM optical signals in the wavelength-shifted bidirectional WDM optical network according to the fifth exemplary embodiment of the present disclosure will be described.

The first optical transmitter 711 of the OLT 710 transmits a downstream WDM optical signal to the first high-density wavelength multiplexer/demultiplexer 713 over an odd-numbered channel, the first high-density wavelength multiplexer/demultiplexer 713 wavelength-multiplexes the downstream WDM optical signal, and the first optical circulator 714 transfers the downstream WDM optical signal wavelength-multiplexed by the first high-density wavelength multiplexer/demultiplexer 713 through the optical fiber line 720. Subsequently, the second optical circulator 732 of the RN 730 transfers the wavelength-multiplexed downstream WDM optical signal transferred through the optical fiber line 720 to the second high-density wavelength multiplexer/demultiplexer 731, the second high-density wavelength multiplexer/demultiplexer 731 wavelength-demultiplexes the wavelength-multiplexed downstream WDM optical signal transferred through the second optical circulator 732, and the second optical receiver 742 of the ONU 740 receives the downstream WDM optical signal wavelength-demultiplexed by the second high-density wavelength multiplexer/demultiplexer 731 over an even-numbered channel.

In addition, the second optical transmitter 741 of the ONU 740 transmits an upstream WDM optical signal to the second high-density wavelength multiplexer/demultiplexer 731 over an odd-numbered channel, the second high-density wavelength multiplexer/demultiplexer 731 of the RN 730 shifts the center wavelength of the upstream WDM optical signal and wavelength-multiplexes the upstream WDM optical signal with the shifted center wavelength, and the second optical circulator 732 transfers the upstream WDM optical signal wavelength-multiplexed by the second high-density wavelength multiplexer/demultiplexer 731 through the optical fiber line 720. Subsequently, the first optical circulator 714 of the OLT 710 transfers the wavelength-multiplexed upstream WDM optical signal transferred through the optical fiber line 720 to the first high-density wavelength multiplexer/demultiplexer 713, the first high-density wavelength multiplexer/demultiplexer 713 wavelength-demultiplexes the wavelength-multiplexed upstream WDM optical signal transferred through the first optical circulator 714, and the first optical receiver 712 receives the upstream WDM optical signal wavelength-demultiplexed by the first high-density wavelength multiplexer/demultiplexer 713 over an even-numbered channel.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A wavelength-shifted bidirectional wavelength division multiplexing (WDM) optical network comprising:
    an optical fiber line;
    an optical line terminal (OLT) comprising
        a first optical transmitter transmitting a downstream WDM optical signal,
        a first standard wavelength multiplexer/demultiplexer that wavelength-multiplexes the downstream WDM optical signal,
        a first optical circulator
            transferring the wavelength-multiplexed downstream WDM optical signal through the optical fiber line, and
            transferring a wavelength-multiplexed upstream WDM optical signal transferred through the optical fiber line,
        a first wavelength-shifted wavelength multiplexer/demultiplexer that wavelength-demultiplexes the wavelength-multiplexed upstream WDM optical signal transferred through the first optical circulator to form a wavelength-demultiplexed upstream WDM optical signal, and
        a first optical receiver receiving the wavelength-demultiplexed upstream WDM optical signal;
    a remote node (RN) comprising
        a second wavelength-shifted wavelength multiplexer/demultiplexer
            shifting a center wavelength of an upstream WDM optical signal, and
            wavelength-multiplexing the upstream WDM optical signal with the shifted center wavelength to form the wavelength-multiplexed upstream WDM optical signal,
        a second optical circulator
            transferring the wavelength-multiplexed upstream WDM optical signal through the optical fiber line, and
            transferring the wavelength-multiplexed downstream WDM optical signal transferred through the optical fiber line, and
        a second standard wavelength multiplexer/demultiplexer that wavelength-demultiplexes the wavelength-multiplexed downstream WDM optical signal transferred through the second optical circulator to form a wavelength-demultiplexed downstream WDM optical signal; and
    multiple optical network units (ONUs) each comprising
        a second optical transmitter transmitting the upstream WDM optical signal to the second wavelength-shifted wavelength multiplexer/demultiplexer, and
        a second optical receiver receiving the wavelength-demultiplexed downstream WDM optical signal.

2. The wavelength-shifted bidirectional WDM optical network of claim 1, wherein the second wavelength-shifted wavelength multiplexer/demultiplexer shifts the center wavelength of the upstream WDM optical signal to be between center wavelengths of adjacent downstream WDM optical signals.

3. The wavelength-shifted bidirectional WDM optical network of claim 1, wherein pairs are formed on a channel-by-channel basis by pairing each channel of the second standard wavelength multiplexer/demultiplexer with a respective channel of the second wavelength-shifted wavelength multiplexer/demultiplexer, the pairs being connected to the multiple ONUs on the channel-by-channel basis.

4. The wavelength-shifted bidirectional WDM optical network of claim 1, wherein
    the first optical transmitter is connected to each channel of the first standard wavelength multiplexer/demultiplexer, and
    the first optical receiver is connected to each channel of the first wavelength-shifted wavelength multiplexer/demultiplexer.

5. The wavelength-shifted bidirectional WDM optical network of claim 1, wherein a light source of the first optical transmitter comprises one selected from the group consisting of a wavelength-tunable laser light source, a wavelength-locked laser light source, a broadband incoherent light source, and a broadband external-injection wavelength-locked light source.

6. The wavelength-shifted bidirectional WDM optical network of claim 1, wherein a light source of the second optical transmitter comprises one selected from the group consisting of a wavelength-tunable laser light source, a wavelength-locked laser light source, and a broadband incoherent light source.

7. The wavelength-shifted bidirectional WDM optical network of claim 1, wherein the OLT further comprises:
an external light source generating an optical signal; and
a third optical circulator transferring the generated optical signal to the first standard wavelength multiplexer/demultiplexer.

8. The wavelength-shifted bidirectional WDM optical network of claim 7, wherein the external light source is one selected from the group consisting of a broadband incoherent light source, a wavelength-multiplexed light source using coherent laser light sources, and a broadband comb light source.

9. The wavelength-shifted bidirectional WDM optical network of claim 1, wherein each of the first standard wavelength multiplexer/demultiplexer, the first wavelength-shifted wavelength multiplexer/demultiplexer, the second standard wavelength multiplexer/demultiplexer, and the second wavelength-shifted wavelength multiplexer/demultiplexer comprises an arrayed waveguide grating (AWG) and a thin-film filter.

10. A wavelength-shifted bidirectional wavelength division multiplexing (WDM) optical network comprising:
an optical line terminal (OLT) comprising
a first optical transmitter transmitting a downstream WDM optical signal,
a first high-density wavelength multiplexer/demultiplexer
wavelength-multiplexing the downstream WDM optical signal, and
wavelength-demultiplexing a wavelength-multiplexed upstream WDM optical signal to form a wavelength-demultiplexed upstream WDM optical signal, and
a first optical receiver receiving the wavelength-demultiplexed upstream WDM optical signal;
a remote node (RN) comprising
a second high-density wavelength multiplexer/demultiplexer
shifting a center wavelength of an upstream WDM optical signal,
wavelength-multiplexing the upstream WDM optical signal with the shifted center wavelength to form the wavelength-multiplexed upstream WDM optical signal, and
wavelength-demultiplexing the wavelength-multiplexed downstream WDM optical signal to form a wavelength-demultiplexed downstream WDM optical signal; and
multiple optical network units (ONUs) each comprising
a second optical transmitter transmitting the upstream WDM optical signal to the second high-density wavelength multiplexer/demultiplexer, and
a second optical receiver receiving the wavelength-demultiplexed downstream WDM optical signal.

11. The wavelength-shifted bidirectional WDM optical network of claim 10,
wherein the second high-density wavelength multiplexer/demultiplexer shifts the center wavelength of the upstream WDM optical signal to be between center wavelengths of adjacent downstream WDM optical signals.

12. The wavelength-shifted bidirectional WDM optical network of claim 10, wherein odd-numbered channels of the first high-density wavelength multiplexer/demultiplexer are connected to the first optical transmitter, and even-numbered channels of the first high-density wavelength multiplexer/demultiplexer are connected to the first optical receiver; and
odd-numbered channels of the second high-density wavelength multiplexer/demultiplexer are connected to the second optical receiver, and even-numbered channels of the second high-density wavelength multiplexer/demultiplexer are connected to the second optical transmitter.

13. The wavelength-shifted bidirectional WDM optical network of claim 10, wherein the OLT further comprises an optical isolator disposed by a downstream WDM optical channel at a front end of first optical transmitter, and
wherein the ONU s further comprise an optical isolator disposed at a front end of the second optical transmitter.

14. The wavelength-shifted bidirectional WDM optical network of claim 10, wherein each of the first high-density wavelength multiplexer/demultiplexer and the second high-density wavelength multiplexer/demultiplexer comprises a 2×2N high-density wavelength multiplexer/demultiplexer; and
wherein the OLT further comprises an optical circulator disposed at a front end of the first high-density wavelength multiplexer/demultiplexer; and
wherein the remote node further comprises an optical circulator at a front end of the second high-density wavelength multiplexer/demultiplexer.

15. The wavelength-shifted bidirectional WDM optical network of claim 14, wherein odd-numbered channels of the first high-density wavelength multiplexer/demultiplexer are connected to the first optical transmitter, and even-numbered channels of the first high-density wavelength multiplexer/demultiplexer are connected to the first optical receiver; and
even-numbered channels of the second high-density wavelength multiplexer/demultiplexer are connected to the second optical receiver, and odd-numbered channels of the second high-density wavelength multiplexer/demultiplexer are connected to the second optical transmitter.

* * * * *